(12) United States Patent
Fischer (10) Patent No.: US 9,442,939 B2
(45) Date of Patent: Sep. 13, 2016

(54) ROUTING FRAMEWORK FOR OBJECTS

(71) Applicant: Martin Fischer, Heidelberg (DE)

(72) Inventor: Martin Fischer, Heidelberg (DE)

(73) Assignee: SAP SE, Walldorf (DE)

( * ) Notice: Subject to any disclaimer, the term of this patent is extended or adjusted under 35 U.S.C. 154(b) by 386 days.

(21) Appl. No.: 14/062,604

(22) Filed: Oct. 24, 2013

(65) Prior Publication Data

US 2015/0120635 A1    Apr. 30, 2015

(51) Int. Cl.
| | | |
|---|---|---|
| G06F 17/30 | (2006.01) | |
| G06F 3/06 | (2006.01) | |
| G06F 9/44 | (2006.01) | |
| G06Q 10/00 | (2012.01) | |

(52) U.S. Cl.
CPC ....... *G06F 17/30091* (2013.01); *G06F 3/0667* (2013.01); *G06F 8/24* (2013.01); *G06Q 10/00* (2013.01)

(58) Field of Classification Search
None
See application file for complete search history.

(56) References Cited

U.S. PATENT DOCUMENTS

| 6,154,748 A | 11/2000 | Gupta et al. |
| 2003/0212687 A1 | 11/2003 | Gonos |
| 2007/0050333 A1 | 3/2007 | Vogler |
| 2011/0167402 A1 | 7/2011 | Ahmad |

OTHER PUBLICATIONS

Jacinto, M.H. et al., "Bidirectional Conversion Between XML Documents and Relational Data Bases," Computer Supported Cooperative Work in Design, 2002. The 7th International Conference on Sep. 25-27, 2002, Piscataway, NJ USA, IEEE, Sep. 25, 2002, pp. 437-443, XP010615730, ISBN: 978-85-285-0050-9 *the whole document*.

Extended European Search Report (from a corresponding foreign application) Application No. 14188358.7-1951 / 2863324, dated Mar. 25, 2015.

*Primary Examiner* — Stanley K Hill
*Assistant Examiner* — Nathan Brown, Jr.
(74) *Attorney, Agent, or Firm* — Fountainhead Law Group PC (57) ABSTRACT

Particular embodiments store a business object attachment in a specific storage location associated with a business object. In this embodiment a computer receives an attachment for the business object along with information regarding the business object. The information regarding the business object may include a business object identifier and a business object type identifier. With this information, the computer defines routing attribute fields for the attachment. Using the routing attribute fields and the business object type identifier, the computer calculates a target content repository and a target path for the attachment. The computer then determines which content management system contains the target repository and interfaces with that target content management system to direct that content management system to store the attachment in the target repository at the target path.

20 Claims, 6 Drawing Sheets

ROUTING FRAMEWORK FOR OBJECTS

BACKGROUND

Unless otherwise indicated herein, the approaches described in this section are not prior art to the claims in this application and are not admitted to be prior art by inclusion in this section.

An attachment to a business object is not typically stored with the business object in a business object repository. Instead, the attachment is directed to a content repository within a content management system. The file location and file ID may then be stored with the business object, but the location of the attachment is determined by the content management system. Allowing the content management system to arbitrarily determine where to store an attachment may not be desirable.

SUMMARY

Particular embodiments store a business object attachment in a specific storage location associated with a business object. In this embodiment a computer receives an attachment for the business object along with information regarding the business object. The information regarding the business object may include a business object identifier and a business object type identifier. With this information, the computer defines routing attribute fields for the attachment. Using the routing attribute fields and the business object type identifier, the computer calculates a target content repository and a target path for the attachment. The computer then determines which content management system contains the target repository and interfaces with that target content management system to direct that content management system to store the attachment in the target repository at the target path.

The following detailed description and accompanying drawings provide a better understanding of the nature and advantages of the embodiments.

DETAILED DESCRIPTION

Described herein are techniques for a routing framework. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the embodiments. It will be evident, however, to one skilled in the art that the subject matter as defined by the claims may include some or all of the features in these examples alone or in combination with other features described below, and may further include modifications and equivalents of the features and concepts described herein.

The present disclosure relates to a routing framework, and in particular, to a routing framework than allows an attachment to a business object to be stored according to a defined routing rule in a content repository and at a path that is specific for attachments that satisfy the defined rule. For example, an embodiment allows the routing of attachments for business objects to different content management repositories and to different paths, e.g., unique locations in defined folder hierarchies, depending on chosen attributes of the business object.

Figure 1:
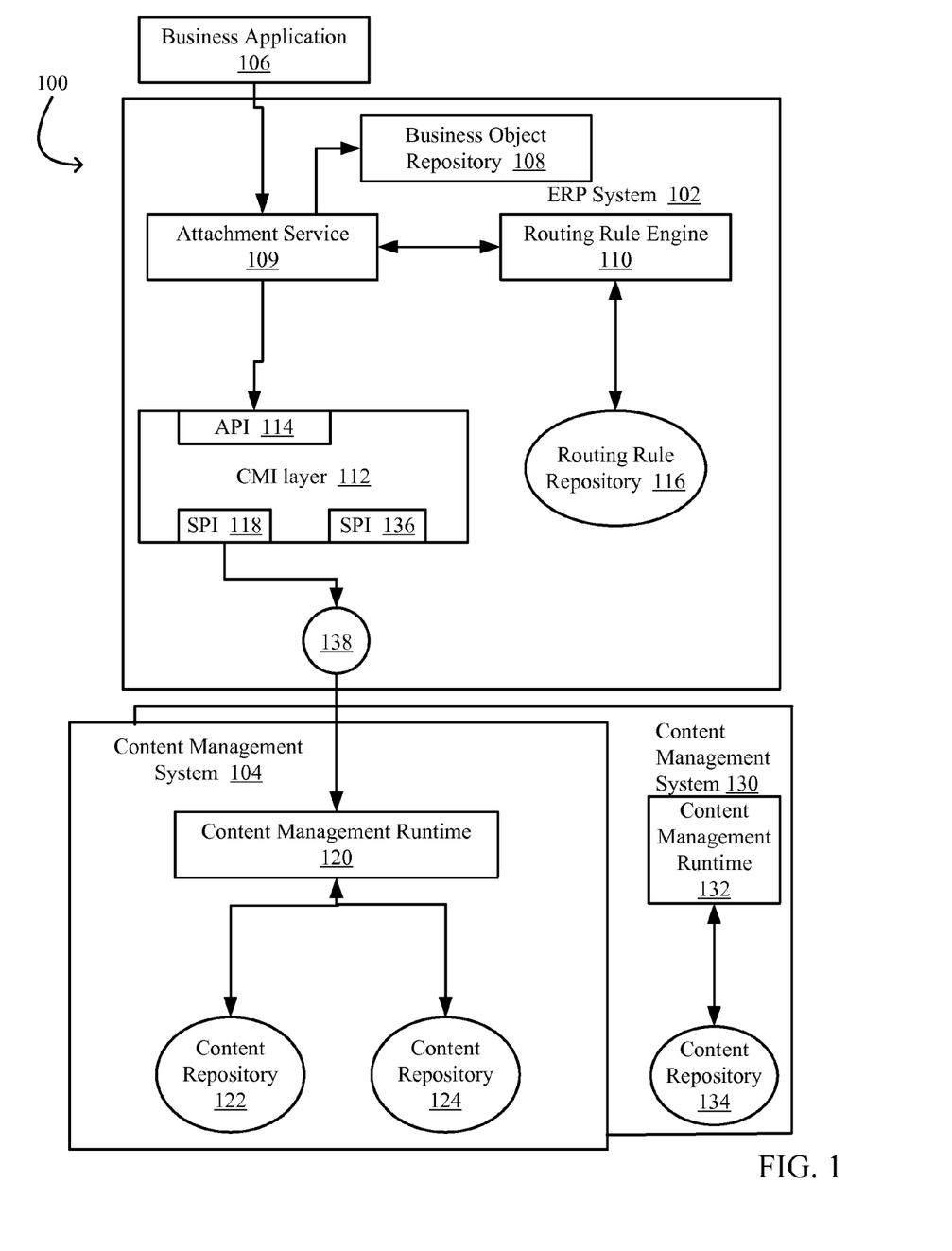
FIG. 1 illustrates a routing framework according to an embodiment.

FIG. 1 illustrates a routing framework 100 according to an embodiment. According to the embodiment, routing framework 100 includes an enterprise system 102, such as an enterprise resource planning (ERP) system, and content management systems 104 and 130. Enterprise system 102 may be an integrated group of software applications that support the internal business processes of a company. Enterprise system 102 may store business objects. Business objects may include information related to a company's business, such as invoices, employees, sales orders, and financial documents. A business object repository 108 stores the business objects. In one embodiment, business object repository 108 stores business objects in a relational database format where information for the business objects may be stored in multiple tables that are linked together. Although a single business object repository is shown, multiple business object repositories 108 may be used, which may be in different locations.

Content management systems 104 and 130 store attachments for the business objects. For example, content repositories 122, 124, and 134 store the business object attachments for the business objects. A business object attachment may be information that relates to a business object. For example, the business object may summarize a transaction for the business, such as the sale of a product. The business object attachment may be a scanned invoice for the transaction. In contrast to the business object, the business object attachment may be unstructured data. In this case, the business object attachment cannot be stored in business object repository 108 because repository 108 stores data in a relational database format (e.g., a structured database format).

Enterprise system 102 includes a business application 106 in communication with a business object repository 108. Business application 106 may create business objects and related attachments. For example, business application 106 creates financial statements and related financial documents. In one embodiment, the business object can be globally identified by identifiers, such as a business object identifier, a business object type identifier and/or a business object system identifier. A business object identifier is assigned to a business object when it is created and is used to identify and retrieve the business object. A business object type identifier identifies the type of business object, such as a business entity (e.g., a financial document, an employee, or a sales order). Business object types break a business object system down into smaller, disjunctive units. Also, a business object system identifier identifies the enterprise system from which the business object originated. Although a business object identifier, a business object type identifier and/or a business object system identifier are mentioned, not all of the identifiers may be used. For example, the business object system identifier may not be needed.

To store a business object and its attachment, enterprise system 102 sends the business object and the attachment to an attachment service 109 along with information for the business object, such as the business object identifier, business object type identifier and business object system identifier. Attachment service 109 may store the business objects in a business object repository 108. Also, attachment service 109 forwards attachments to such business objects for storage by content management systems 104 or 130. To determine the correct content management system, attachment service 109 communicates with a routing rule engine 110 to determine which particular content management system and at what path within the content management system to store an attachment.

Routing rule engine 110 is in communication with a routing rule repository 116. Routing rule repository 116 includes routing rules (or "rules"), which routing rule engine 116 consults in determining which particular content management system and at what path within the content management system to store an attachment. The rules may be based on certain requirements that govern where and how business objects should be stored based on their associated business object. In one embodiment, the company may need to adhere to certain rules or regulations regarding the business object attachments. For example, a legal requirement may state that the business object attachment's physical storage location is in the country where the financial documents are stored. Routing rule engine 110 may determine applicable rules for the business object attachment based on information for the associated business object for the attachment. Once determining the applicable rules, routing rule engine 110 evaluates the rules to determine where to route the business object attachment. For example, routing rule engine 110 returns a set of routing attribute fields associated with the attachment to attachment service 109. The routing attribute fields may be variables in which information for the associated business object can be inserted into. For example, the attribute fields may list target path fields and a target repository.

Attachment service 109 is also in communication with a content management integration layer (CMI layer) 112 that includes an application programming interface (API) 114. API 114 exposes a unified interface to allow attachment service 109 to access different repositories through a single interface. Attachment service 109 may fill in the attribute fields to generate a target repository and a target path for the attachment using information for the associated business object. For example, attachment service 109 fills in a year associated with the business object and a company region. In one embodiment, the target path may be /USA1/2011 where USA1 is the region in which a transaction for the business object took place and 2011 is the year the transaction occurred.

CMI layer 112 also includes service provider interfaces (SPI) 118 and 136 for interfacing with content management systems 104 and 130 respectively. The different SPIs allow CMI layer 112 to interface with different types of content management systems. For example, different content management systems may use different protocols/formats. Different SPIs are used to communicate in the different protocols/formats.

CMI layer 112 can manipulate, i.e., read, write, or delete, attachments and metadata on content management systems 104 and 130 for storage. Content management systems 104 and 130 are systems that allow the storage and manipulation (read, write, modify, and delete) of content from a central interface. Content management system 104 includes a content management runtime manager 120 and content repositories 122 and 124. Content management system 130 includes a content management runtime manager 132 and content repository 134. However, content management systems may include various numbers of repositories. Content management runtime managers 120 and 132 cause a runtime application (not shown) to interact with content repositories 122, 124, and 134 according to instructions from CMI layer 112. For example, content repositories 122, 124, and 134 store the business object attachments at the paths determined by attachment service 109. SPIs 118 and 136 communicate via network interfaces 138, which will be described in more detail below.

Figure 2:
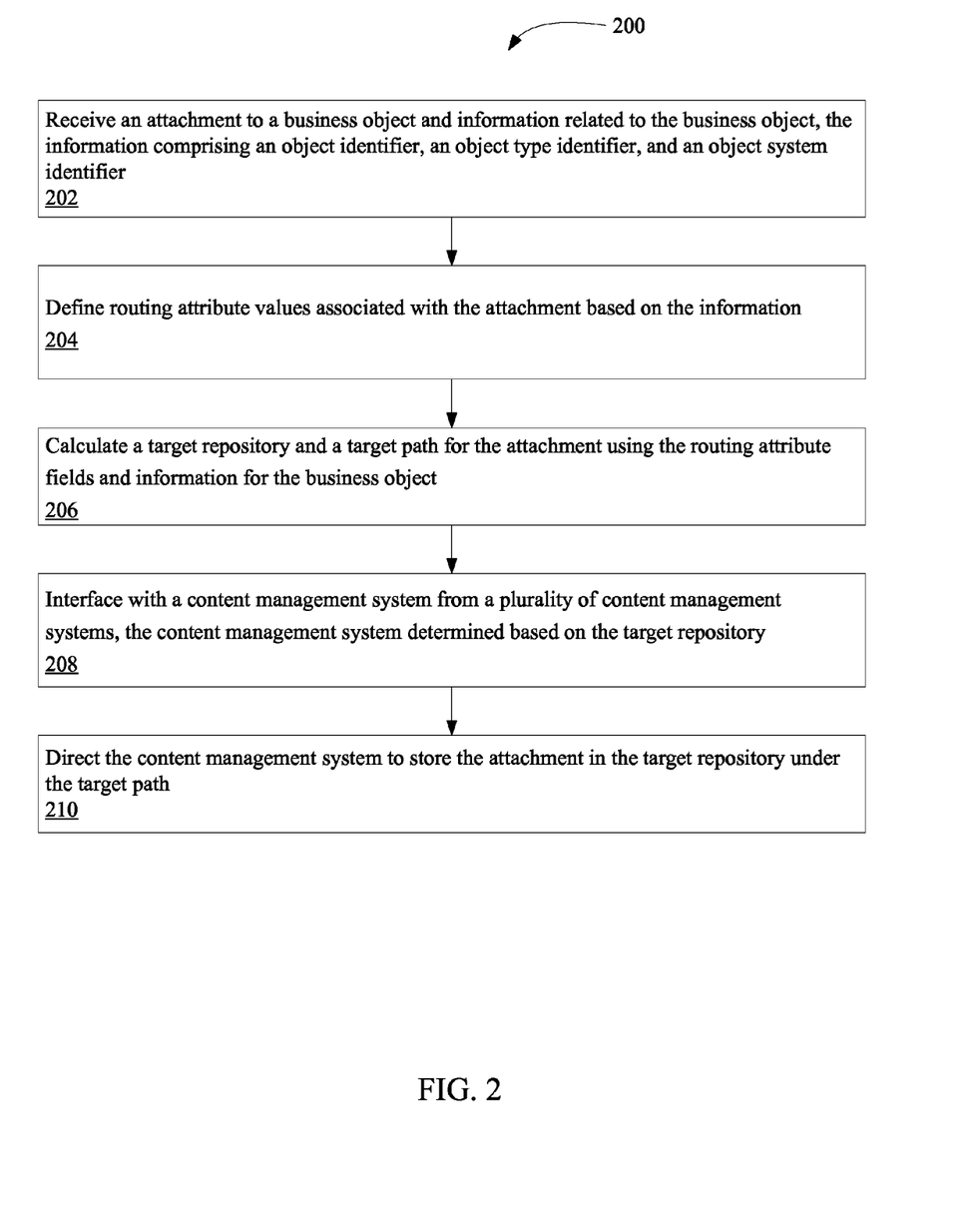
FIG. 2 is a flow chart of a method for a routing framework according to an embodiment.

FIG. 2 is a flow chart of a method 200 for a routing framework according to an embodiment. In FIG. 2, at 202, attachment service 109 receives an attachment to a business object and information related to the attachment from business application 106. The attachment information may include a business object identifier, a business object type identifier, and a business object system identifier.

Attachment service 109 forwards the attachment information to routing rule engine 110. With the attachment information, routing rule engine 110 searches routing rule repository 116 for a routing rule that applies. With an applicable routing rule, at 204, routing rule engine 110 defines routing attribute fields for the attachment based on the attachment information. At 206, attachment service 109 calculates a target repository (e.g., content repository 124) and a target path for the attachment using the routing attribute fields and information for the business object. At 208, attachment service 109 interfaces via CMI layer 112 with the content management system, i.e., content management system 104, which was determined by CMI layer 112 based on the target repository. As the interface, CMI layer 112 receives the target repository and target path information along with the attachment from business object repository 108. CMI layer 112 then interprets the target repository information and selects an appropriate SPI for communicating with the content management system containing the target repository, i.e., SPI 118. CMI layer 112 then directs the content management system through the SPI to store the attachment in the target repository at the target path.

Figure 3:
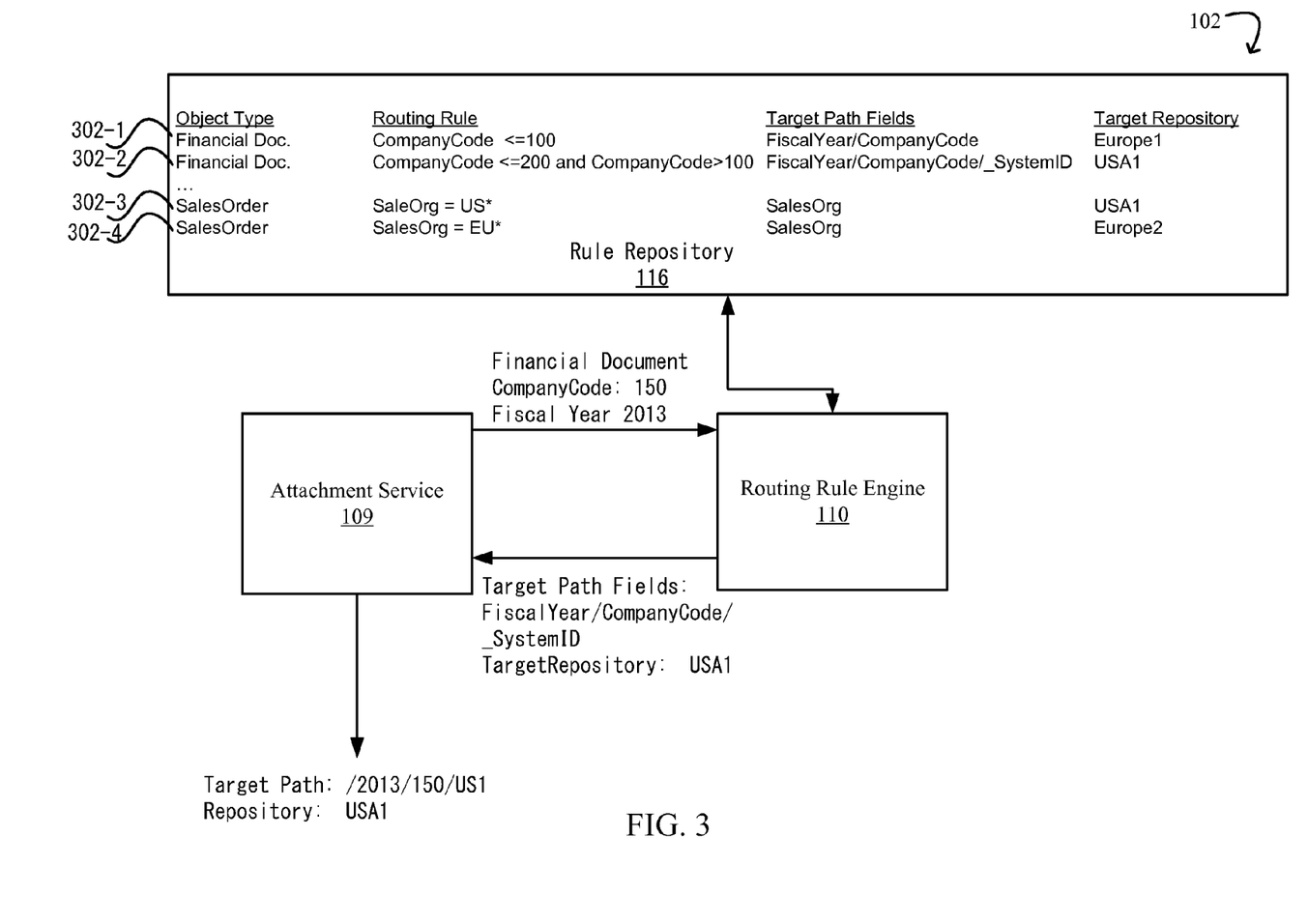
FIG. 3 illustrates an example of evaluating rules in the routing framework according to an embodiment.

FIG. 3 illustrates an example of evaluating rules in routing framework 300 according to an embodiment. Rule repository 116 includes rules 302-1, 302-2, . . . , 302-3, and 302-4. Routing rule engine 110 receives the business object type identifier and other information for the business object. For example, the business object type identifier may be "Financial Document", which indicates the business object is a financial document. Also, routing rule engine 110 receives other information for the business object, such as the company code ("150") and the fiscal year of the business object ("2013"). In other examples, different information may be used to determine applicable rules.

Routing rule engine 110 then determines applicable rules in rule repository 116 based on the information received from attachment service 109. For example, routing rule engine 110 determines applicable rules based on the business object type identifier. In this case, rules 302-1 and 302-2 are applicable because the object type for these rules is Financial Document. Rules 302-3 and 302-3 are not applicable because the object type for these rules is SalesOrder, which is different from the business object type identifier.

Routing rule engine 110 then evaluates the rules using information related to the business object. For example, the routing rule for rule 302-1 evaluates whether the company code is less than or equal to 100. In this case, routing rule engine 110 determines that the company code of 150 is not less than or equal to 100. Thus, routing rule engine 110 determines that rule 302-1 is not satisfied. Rule 302-2 states the company code should be less than or equal to 200 and greater than 100. In this case, routing rule engine 110 determines the company code of 150 satisfies the rule. Thus, routing rule engine 110 determines rules 302-2 is satisfied.

When a rule is satisfied, routing rule engine 110 determines target path fields and a target repository. The target path fields list fields in which information from the business object can be inserted. For example, the fields for rule 302-2 are a fiscal year and a company code. The target repository lists the target repository in which the business object attachment should be stored. In this case, the target repository is USA1. Once determining the valid rules, routing rule engine 110 returns the target path fields and target repository for the valid rules to attachment service 109.

Attachment service 109 may then generate the target path by filling in the target path fields. For example, attachment service 109 determines the values for the fields based on information from the business object. Attachment service 109 may insert 2013 for the field FiscalYear, 150 for the field CompanyCode, and US1 for the field _SystemID. The value for the field _SystemID may be the business object system identifier. Attachment service 109 then sends the path and repository to CMI layer 112.

Figure 4:
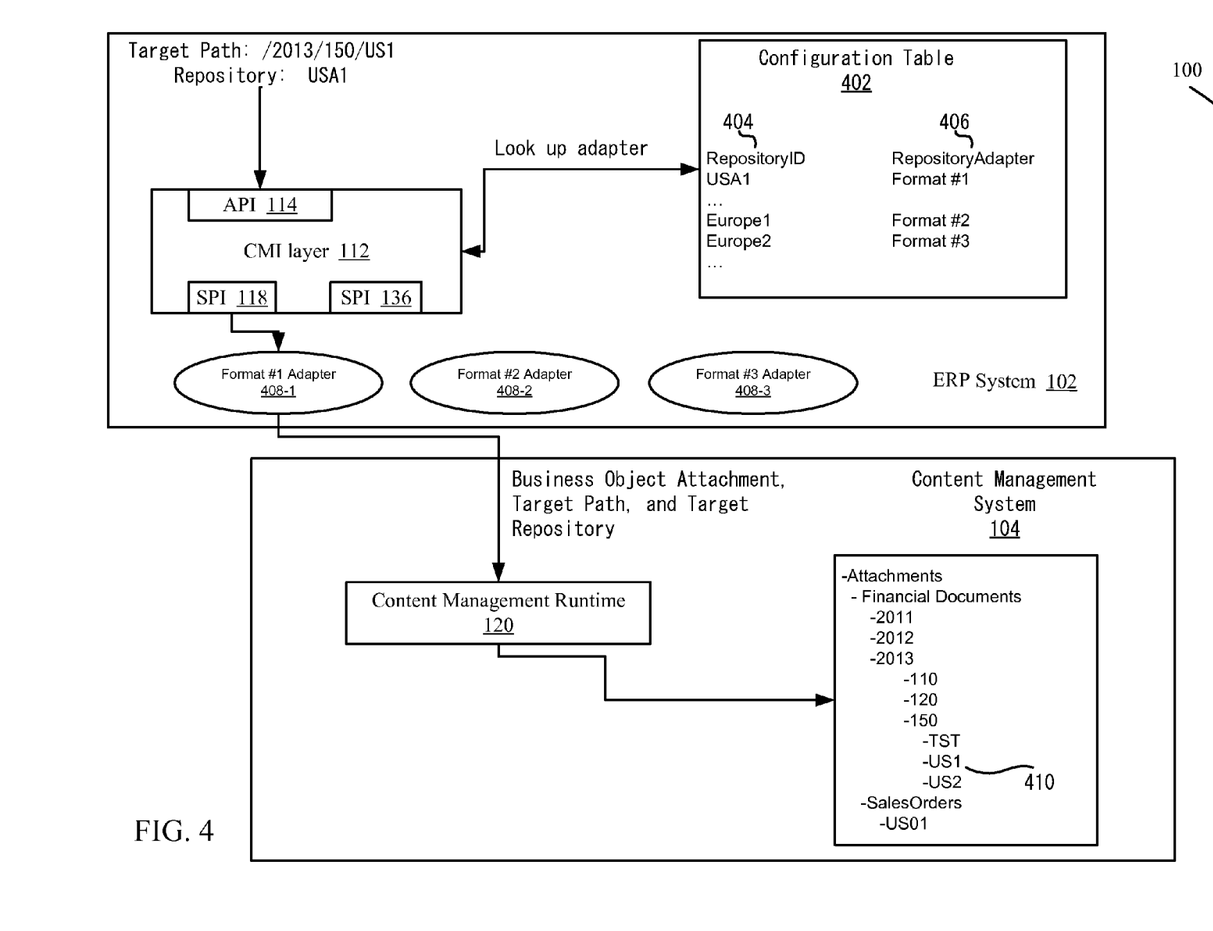
FIG. 4 depicts an example for routing business object attachments to content repositories according to one embodiment.

FIG. 4 depicts an example for routing business object attachments to content repositories according to one embodiment. CMI layer 112 receives the target path and repository from attachment service 109. Content management systems may be associated with different types of protocols/formats. For example, different repositories may store attachments using different platforms. To determine the content management system type, CMI layer 112 accesses a configuration table 402 that lists target repositories and their type. For example, table 402 lists repository IDs in a column 404 and a repository adapter in a column 406. The repository adapter is an interface that CMI layer 112 uses to communicate with the target repository. Different repository adapters may be provided for different format or types of content management systems.

CMI layer 112 may have adapters for each type of repository. In this case, the target repository USA1 is a repository format #1 using a first content management format. CMI layer 112 thus uses a format #1 repository adapter 408-1 instead of a format #2 repository adapter 408-2 and a format #3 repository adapter 408-3.

Content management system 104 receives the business object attachment, the target repository, and the target path. Content management runtime manager 120 then determines where to store the business object attachment. For example, content management runtime manager 120 determines a content repository corresponding to the repository identifier. In this case, content management runtime manager 120 determines the repository is USA1. Content management runtime manager 120 then uses the target path to determine where to store the business object attachment in the content repository USA1. For example, the USA1 repository includes a file system and content management runtime manager 120 uses the target path to traverse the file system and store the business object attachment in a destination folder corresponding to the target path at 410. In this case, content management runtime manager 120 stores the business object attachment in the folder US1.

Figure 5:
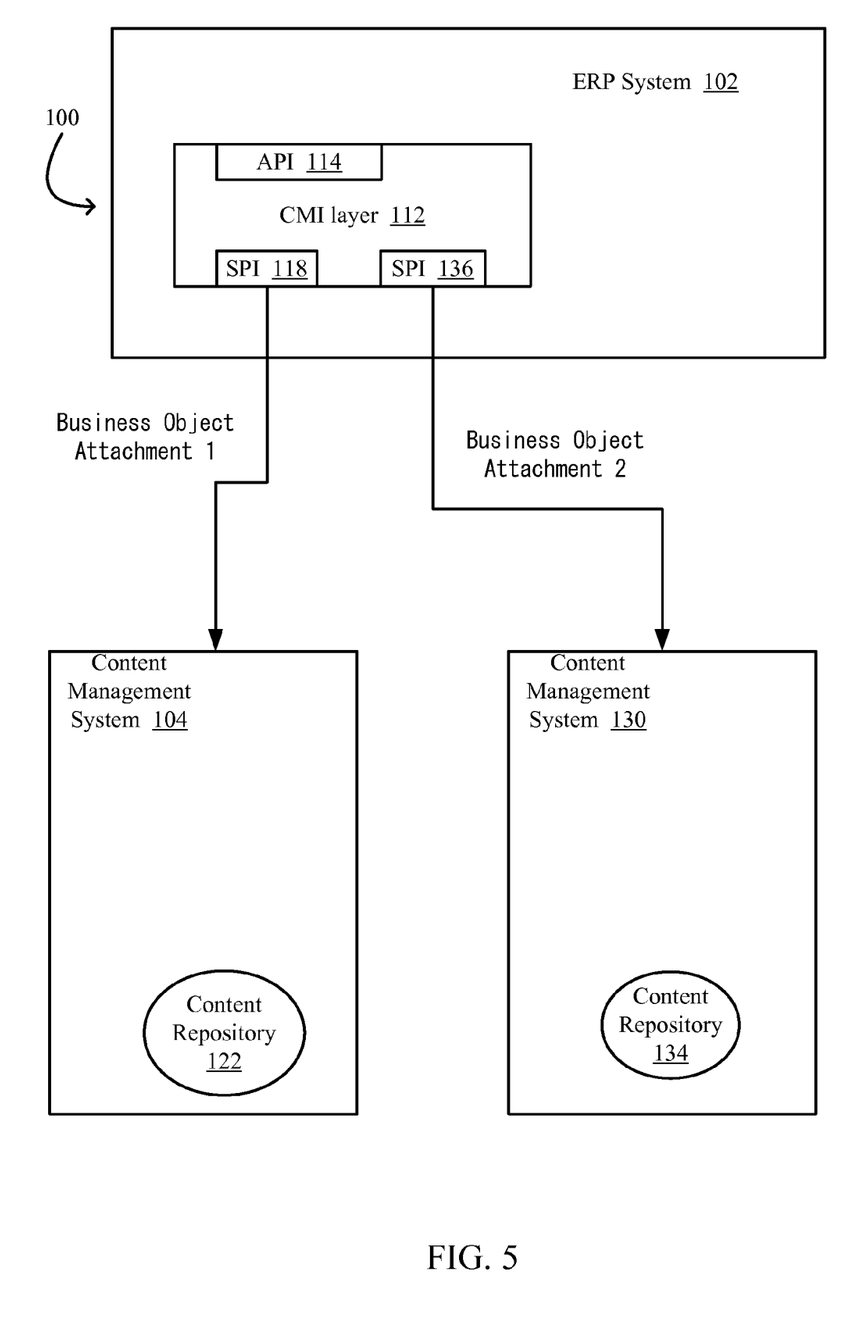
FIG. 5 depicts an example of routing attachments to different repositories according to one embodiment.

ERP system 102 may route different attachments to different repositories to satisfy different rules. FIG. 5 depicts an example of routing attachments to different repositories according to one embodiment. Below, two different examples are for two different business object attachments 1 and 2. Example 1 is associated with a business object for a company USA1 and a year 2011. Example 2 is associated with a business object for a company EUR2 and a year 2012. The following summarize the target paths and target repositories for the two business object attachments:

Example 1

Company: USA1
Year: 2011
Target repository: USA
Target path: /USA1/2011

Example 2

Company: EUR2
Year: 2012
Target repository: EUROPE
Target path: /EUR2/2012

The two business object attachments are associated with different repositories. In FIG. 5, CMI layer 112 routes a first business object attachment 1 for example 1 through SPI 118 to a content management system 104, which may be in the USA. Then, content management system 104 stores the business object attachment 1 in the target repository USA at the target path of USA1/2011 in content repository 122. CMI layer 112 routes the business object attachment 2 via SPI 136 to content management system 130, which may be in Europe. Then, content management system 130 stores the second business object attachment in the target repository EUR at the target path of EUR2/2012 in content repository 134.

Particular embodiments segregate attachments to business objects into storage locations according to defined rules contained by routing rule repository 116. This ability allows a storage location, i.e., content repository and path, to be the sole storage location for all attachments that satisfy a given rule. For example, if attachments to certain financial business objects that originate from the European Union (EU) must remain physically stored in the EU, a rule may be defined within rule repository 116 that specifies such documents be stored in a content management system located in the EU. This ability also allows the transfer en masse of all attachments that were stored according to a given rule. For example, a rule may be defined within rule repository 116 specifying that all attachments created by Company A be stored in a content repository 122. Thus, if Company A is purchased, all attachments created by Company A may be transferred to the purchaser by transferring the contents of the appropriate storage location. Accordingly, the embodiment may reduce or avoid the need to search multiple repositories for content if content was stored according to a rule in routing rule repository 116.

Another aspect of an embodiment is that a company responding to an ongoing discovery request may create an appropriate rule in routing rule repository 116. An appropriate rule might include creating copies of responsive documents and storing those copies in a storage location specific to the discovery request. There may also be reason to store attachments in a storage location according to a common feature. The common feature may be, for example, a company, a business department (such as finance, R&D, etc.), an origination date, the originating ERP system, the originating business application, or the originating business object, or any combination of common features.

System Overview

Figure 6:
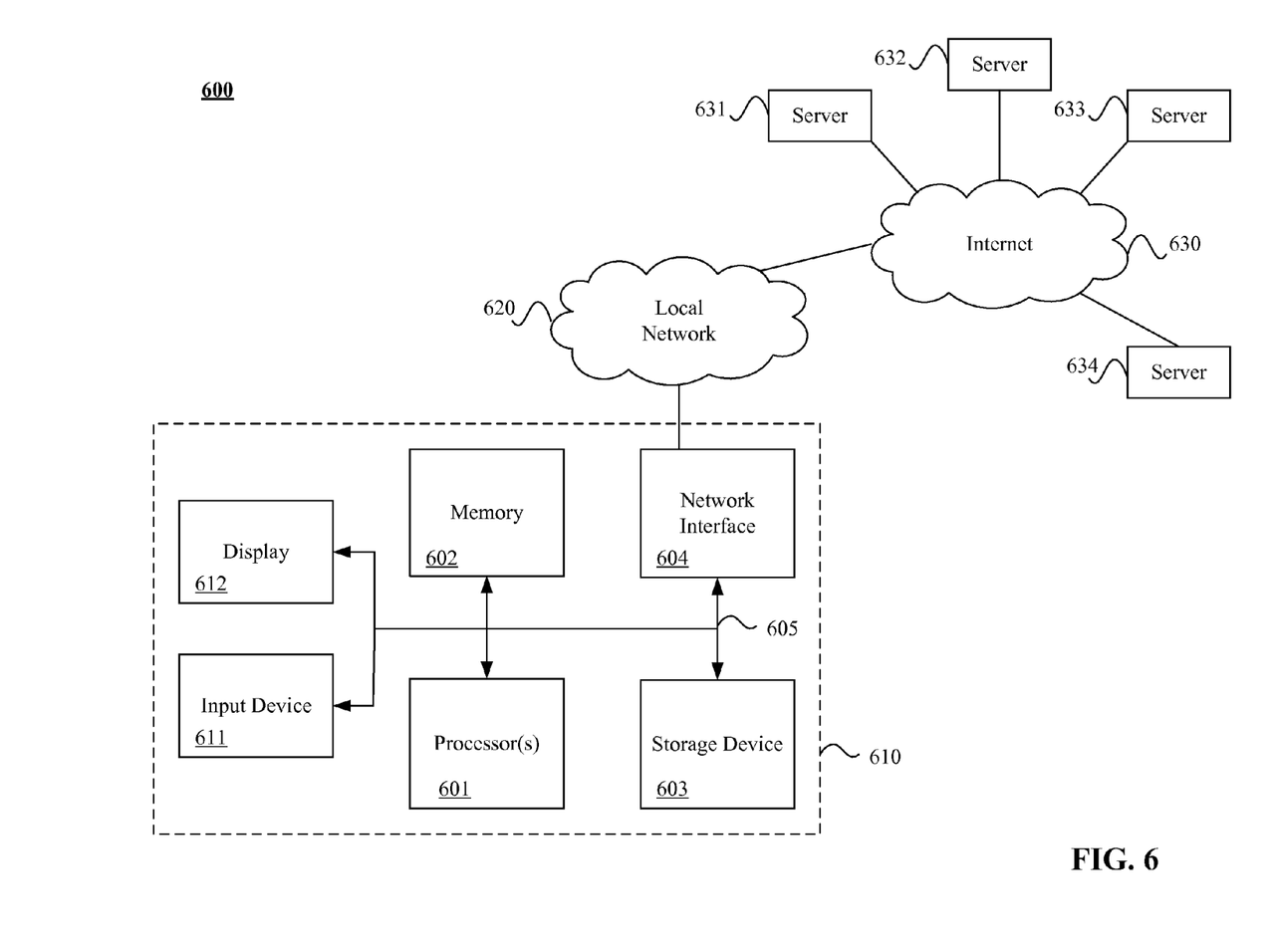
FIG. 6 illustrates hardware of a special purpose computing machine configured with a process according to the above disclosure.

FIG. 6 illustrates hardware of a special purpose computing machine configured with a process according to the above disclosure. The following hardware description is merely one example. It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system 610 also includes a network interface 604 coupled with bus 605. Network interface 604 may provide two-way data communication between computer system 610 and a local network 620. The network interface 604 may be a wireless or wired connection, for example. Computer system 610 can send and receive information through the network interface 604 across a local area network, an Intranet, a cellular network, or the Internet, for example. One example implementation may include a browser executing on a computing system 610. A browser, for example, may access data and features on backend systems that may reside on multiple different hardware servers 631-635 across the network. Servers 631-635 and server applications may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for storing a business object attachment in a target repository of a plurality of repositories, the method comprising:
   receiving, by a computer system, a business object attachment to a business object and information related to the business object;
   determining, by the computer system, a set of routing attribute fields associated with the business object attachment based on the information related to the business object and the target repository;
   calculating, by the computer system, a target path for the target repository in a content management system in a plurality of content management systems, wherein the target path is calculated using the set of routing attribute fields and the information related to the business object before interfacing with the content management system;
   interfacing, by the computer system, with the content management system in the plurality of content management systems, the content management system including the target repository; and
   directing, by the computer system, the content management system to store the business object attachment in the target repository at the target path.

2. The method of claim 1, wherein determining the set of routing attribute fields further comprises sending the information to a rule engine, wherein the rule engine compares the information related to the business object to rules to determine the set of routing attribute fields.

3. The method of claim 2, further comprising:
   determining an applicable rule in a plurality of rules based on the information related to the business object; and
   determining the set of routing attribute fields that are associated with the rule.

4. The method of claim 3, further comprising:
   determining whether the applicable rule is satisfied by evaluating the applicable rule against the information related to the business object; and
   determining the set of routing attribute fields that are associated with the applicable rule when the applicable rule is satisfied.

5. The method of claim 3, wherein determining the applicable rule comprises:
   comparing a business object type from the information related to the business object to an object type for the plurality of rules; and
   determining the applicable rule based on the applicable rule having the object type that is determined to match the business object type.

6. The method of claim 1, wherein interfacing comprises filling in the set of routing attribute fields with corresponding information from the information related to the business object.

7. The method of claim 1, wherein calculating, by the computer system, the target repository comprises:
   determining a format associated with the target repository, and
   communicating with the target repository via an adapter configured for the format associated with the target repository.

8. The method of claim 1, wherein the business object is stored in a relational database format and the business object attachment is stored as unstructured data in the target repository.

9. A non-transitory computer-readable media storing one or more programs for storing a business object attachment in a target repository among a plurality of repositories, the one or more programs comprising instructions for:
receiving a business object attachment to a business object and information related to the business object;
determining a set of routing attribute fields associated with the business object attachment based on the information related to the business object and the target repository;
calculating a target path for the target repository in a content management system in a plurality of content management systems, wherein the target path is calculated using the set of routing attribute fields and the information related to the business object before interfacing with the content management system;
interfacing with the content management system in the plurality of content management systems, the content management system including the target repository; and
directing the content management system to store the business object attachment in the target repository at the target path.

10. The non-transitory computer-readable media of claim 9, wherein determining the set of routing attribute fields further comprises sending the information to a rule engine, wherein the rule engine compares the information related to the business object to rules to determine the set of routing attribute fields.

11. The non-transitory computer-readable media of claim 10, further configured for:
determining an applicable rule in a plurality of rules based on the information related to the business object; and
determining the set of routing attribute fields that are associated with the rule.

12. The non-transitory computer-readable media of claim 11, further configured for:
determining whether the applicable rule is satisfied by evaluating the applicable rule against the information related to the business object; and
determining the set of routing attribute fields that are associated with the applicable rule when the applicable rule is satisfied.

13. The non-transitory computer-readable media of claim 11, wherein determining the applicable rule comprises:
comparing a business object type from the information related to the business object to an object type for the plurality of rules; and
determining the applicable rule based on the applicable rule having the object type that is determined to match the business object type.

14. The non-transitory computer-readable media of claim 9, wherein interfacing comprises filling in the set of routing attribute fields with corresponding information from the information related to the business object.

15. The non-transitory computer-readable media of claim 9, wherein calculating, by the computer system, the target repository comprises:
determining a format associated with the target repository, and
communicating with the target repository via an adapter configured for the format associated with the target repository.

16. The non-transitory computer-readable media of claim 9, wherein the business object is stored in a relational database format and the business object attachment is stored as unstructured data in the target repository.

17. A computer system for storing a business object attachment in a target repository among a plurality of repositories, the system comprising:
at least one processor;
at least one computer-readable medium, and
a network, wherein the at least one computer-readable medium has instructions stored thereon, which when executed by the at least one processor configure the system for:
receiving a business object attachment to a business object and information related to the business object;
determining a set of routing attribute fields associated with the business object attachment based on the information related to the business object and the target repository;
calculating a target path for the target repository in a content management system in a plurality of content management systems, wherein the target path is calculated using the set of routing attribute fields and the information related to the business object before interfacing with the content management system;
interfacing with the content management system in the plurality of content management systems, the content management system including the target repository; and
directing the content management system to store the business object attachment in the target repository at the target path.

18. The system of claim 17, wherein determining the set of routing attribute fields further comprises sending the information to a rule engine, wherein the rule engine compares the information related to the business object to rules to determine the set of routing attribute fields.

19. The system of claim 18, further configured for:
determining an applicable rule in a plurality of rules based on the information related to the business object; and
determining the set of routing attribute fields that are associated with the rule.

20. The system of claim 19, wherein determining the applicable rule comprises:
comparing a business object type from the information related to the business object to an object type for the plurality of rules; and
determining the applicable rule based on the applicable rule having the object type that is determined to match the business object type.

* * * * *